United States Patent [19]

Clarke et al.

[11] 4,361,452
[45] Nov. 30, 1982

[54] METHOD OF ADHERING WALLCOVERING USING AQUEOUS ADHESIVE COMPOSITIONS

[75] Inventors: John B. Clarke; Peter Flesher, both of Bradford, England

[73] Assignee: Allied Colloids Limited, Bradford, England

[21] Appl. No.: 267,484

[22] Filed: May 27, 1981

Related U.S. Application Data

[63] Continuation-in-part of Ser. No. 64,662, Aug. 8, 1979, abandoned.

[30] Foreign Application Priority Data

Nov. 10, 1978 [GB] United Kingdom ............... 44035/78
Aug. 6, 1979 [EP] European Pat. Off. ......... 79301579.3
Aug. 8, 1979 [CA] Canada .................................. 333388
Aug. 16, 1979 [GB] United Kingdom ............... 33487/78

[51] Int. Cl.³ .............................................. E04B 2/00
[52] U.S. Cl. ........................................ 156/71; 156/83; 156/308.8; 156/331.8; 427/207.1; 428/350; 428/500; 428/511; 525/201; 526/303.1; 526/307.2; 526/307.3; 526/307.7; 526/312; 524/555
[58] Field of Search ................ 156/71, 308.8, 83, 319, 156/331.8; 427/207.1; 428/349, 500, 350, 511; 260/29.2 N, 29.6 RW, 33.64 A; 525/201; 526/312, 303.1, 307.2, 307.3, 307.7

[56] References Cited

U.S. PATENT DOCUMENTS 3,218,302 11/1965 Mecamed ......................... 526/303.1
3,758,641 9/1973 Zweigle ....................... 260/29.6 RW
3,780,006 12/1973 Zweigle ........................... 526/307.3

FOREIGN PATENT DOCUMENTS 52-837 6/1977 Japan ......................... 260/29.6 RW
1082969 9/1967 United Kingdom .......... 260/29.2 N
1383367 3/1973 United Kingdom ................ 428/500
1453951 10/1976 United Kingdom ................ 428/511

Primary Examiner—John J. Gallagher
Attorney, Agent, or Firm—Lawrence Rosen

[57] ABSTRACT

A liquid polymeric composition comprises a suspension in an organic liquid of particulate water insoluble but water swellable polymer, the particles being less than 10 microns in size. To reduce viscosity in water the swellable polymer may be a copolymer and/or a water soluble polymer may be included. A composition of polymer particles that are swellable and contain both soluble and insoluble polymer can be made by inverse emulsion polymerization. An aqueous adhesive, that may be made by mixing this composition with water, comprises water swollen particulate polymer that may be a copolymer and that may be used with a dissolved polymer in order to reduce the viscosity. Pregummed substrates, such as wallpaper, that can be rendered adhesive by contacting with water are obtained by applying the aqueous or non-aqueous composition to the substrate and drying it on the substrate. Wallcovering can be stuck to a surface using the aqueous adhesive.

11 Claims, No Drawings

METHOD OF ADHERING WALLCOVERING USING AQUEOUS ADHESIVE COMPOSITIONS

This application is a continuation in part of our application Ser. No. 64,662 filed Aug. 8, 1979, now abandoned.

This invention relates to synthetic polymeric compositions, to their production by an inverse emulsion polymerisation process and to the use of aqueous adhesives as wallpaper adhesives.

Known aqueous adhesives are often based on starch or cellulose derivatives and possess a number of undesirable features. One is that they are generally supplied in powder form. The powder can be difficult to disperse or dissolve in water and if the aqueous composition that is prepared is too dilute it is not easy to add more powder to the solution uniformly to obtain a homogeneous increase in viscosity. The powder may be dusty and this is a hazard particularly when a bactericide is included in the powder, which is common when the powder is to be used as wallpaper adhesive.

Liquid aqueous wallpaper and other adhesive pastes have been proposed and indeed manufactured. They often comprise clay and polyvinylacetate bases or silica bases but some based on starch (e.g. as described in U.S. Pat. No. 3,915,728) are known. However they all tend to be rather expensive and inconvenient to use.

It is known to form pregummed wallpaper. In British Patent Specification No. 1,207,387 the adhesive on pregummed paper comprises a high molecular weight bonding agent that may be water soluble or water insoluble and an insoluble, but cold water swelling, cross-linked starch derivative in granular form. In one method a suspension of the cross-linked starch in a solution of the high molecular weight polymeric material in a solvent that does not swell or dissolve the starch derivative is applied to the substrate. In another method, a powdered mixture of the starch derivative and the polymeric material is coated onto a substrate and the polymeric material is then fused. In an example, a starch derivative passing through a 200 mesh sieve is used.

Adhesives based wholly on synthetic polymers are also known. In British Specification No. 1,376,392 and U.S. Pat. No. 3,758,641 it is described how the properties of aqueous adhesive based on a water swellable but substantially water insoluble polymer gel are improved by including a water soluble cationic polymer. The gel polymer is preferably an anionic polymer. If liquid, especially aqueous, compositions are formed they will tend to separate on storage. It is described that the cationic polymer may be mixed with the polymer gel by adding an aqueous solution of the cationic polymer to the polymer gel, and the gel may then be dried to obtain a mixture as fine granules or dried powder. Thus in these methods the composition of swellable (or swollen) polymer and soluble polymer is formed initially either as an aqueous composition of dissolved cationic polymer and swollen polymer gel (with the result that the composition has high viscosity) or as a dry particulate mixture. The various methods described in the specification for making the gel particles include inverse suspension polymerisation as described in U.S. Pat. No. 2,982,749. This method produces water swellable beads having a bead size of up to 100 microns or more, e.g. 50 to 100 microns, and upon contact with water or with an aqueous solution they will swell considerably in size e.g. to 500 microns.

Although conventional inverse suspension techniques produce bead sizes of up to 100 microns or more they can be modified to give smaller bead sizes and also inverse emulsion polymerisation techniques are known. For instance it is described in U.S. Pat. No. 4,059,552 how water insoluble but water swellable polymer particles of less than 4 microns in size and which have no appreciable solubility in water can be made and that the resultant particles will swell in aqueous systems. In particular it is stated that the beads made in the Examples will swell by absorbing (per gram) 75, 50 or 30 grams of aqueous sodium chloride solution (i.e. 1.3 to 3 gms beads per 100 gms solution) and that they will absorb 5 to 10 times as much deionised water (i.e. 13 to 30 gms beads per 100 gms water). For use, the beads must be dispersed in an aqueous system. It is stated that they should be used in amounts of 0.1 to 2% by weight and in the only examples of their use they are used in combination with styrene butadiene latices to give a viscosity of 6,000 centipoise. In one example the concentration of beads is 1% and in the other it is 0.15%. Such aqueous systems would be totally unsatisfactory as wallpaper adhesives.

We have now surprisingly found that aqueous wallpaper adhesives can be formulated from water swellable but water insoluble synthetic polymeric material in such a way as to obtain good bond strength and that it is possible to reduce the viscosity of the compositions to levels acceptable for wallpaper adhesives by, inter alia, appropriate choice of the synthetic polymer. Thus viscosity can be reduced by including water soluble polymeric material in the composition, in the form of particulate polymer, and viscosity can be reduced by forming the water swellable polymer as a copolymer.

In the invention an aqueous adhesive composition and a wallcovering are applied to a surface and the wallcovering is thereby bonded to the surface. They may be applied in any conventional manner, for instance using pregummed wallpaper or by brushing aqueous adhesive onto the wall or, more usually, the wallcovering. The aqueous adhesive composition consists essentially of, as its adhesive component, synthetic polymeric material present in an amount of from 1 to 10% and which consists substantially only of water swollen particles of synthetic polymer having a dry particle size of less than 10 microns and, optionally, dissolved synthetic polymer, the polymeric being such that a 3% dispersion of the polymeric material in deionised water has a Brookfield viscosity at 20 rpm of at least about 10,000 cps, generally about 10,000 to 80,000 and preferably about 20,000 to 50,000 cps. Depending upon the molecular structure, some useful polymers may have a viscosity of about 80,000 cps, e.g. about 90,000 cps or about 100,000 cps in some instances.

The aqueous adhesive preferably has a viscosity within these ranges but in some instances the amount of polymeric material can be sufficiently low or sufficiently high that the adhesive has viscosities outside these ranges, for instance from 2,000 to 120,000 cps. For most purposes the adhesive will contain more than 2% by weight polymeric material, e.g. 2.2 to 10% and most preferably around 3% by weight. However amounts down to 1% may be suitable for some lightweight wallcoverings.

The aqueous adhesive will be substantially, and preferably totally, free of all polymeric materials other than the defined polymer or polymers, and thus will be free of naturally occurring materials such as starch or latices such as styrene butadiene latices. Preferably the composition consists solely of water, the defined polymeric material, fungicides and/or bactericides and minor amounts of inert organic liquids although as mentioned in more detail below it can be desirable to include also an inorganic particulate material that is swellable in oil.

The aqueous compositions are of value wherever a strong adhesive for bonding paper is required, especially as a wallpaper adhesive, that is to say for sticking a wallcovering such as paper, vinyl or hessian to a solid substrate which may be of plaster, metal, wood or plastics material. Normally such a wallcovering is bonded to a surface by applying the aqueous composition to the wallcovering, and optionally also to the surface, and contacting the wallcovering and the surface while the composition is still wet. However the composition may be applied to the wallcovering and then dried, thus forming a pregummed wallcovering that will become adhesive on contact with water.

The aqueous composition conveniently is made by mixing into water a liquid composition comprising the polymeric material suspended in an organic liquid.

A liquid composition suitable for this or for other purposes comprises polymeric material suspended in an organic liquid, the polymeric material consisting substantially only of particulate water insoluble but water swellable synthetic polymer having a dry particle size of less than 10 microns and, optionally, particulate water soluble polymer having a dry particle size of less than 10 microns, the polymeric material being such that a 3% dispersion of the polymeric material in deionised water has a Brookfield viscosity at 20 rpm of at least 10,000 cps, generally 10,000 to 80,000 cps and preferably 20,000 to 50,000 cps.

Aqueous adhesives can be made simply by mixing the liquid composition in water or pregummed wallcovering that will become adhesive when wetted may be obtained by applying a liquid composition to the wallcovering and drying it on the wallcovering.

The composition may contain a small amount of water, e.g. up to 100 or 150% by weight of the polymer, in which event the swellable polymer may be partly swollen and the soluble polymer may be present as particles of dissolved or swollen polymer. Often the composition is substantially non-aqueous and may thus contain no water or an amount of water that is too low to cause significant dissolution of the soluble polymer and swelling of the swellable polymer. Generally there will be less than 20%, and preferably less than 10%, by weight of water based on the total weight of polymer.

The carrier liquid may be any organic liquid in which the water swellable particles remain substantially unswollen and any water soluble particles remain substantially undissolved. Also of course it must not be toxic to users of the composition. The liquid preferably is a hydrocarbon or halogenated hydrocarbon. The choice of the particular liquid for a composition depends upon the intended use of the composition. Often the composition is intended as a concentrate that can be mixed with water and the organic liquid is then preferably a substantially non-volatile hydrocarbon, e.g. a hydrocarbon having a boiling point between 70° and 200° C. and examples of suitable liquids are mineral oil fractions, xylene and toluene. If the composition is to be applied direct to a substrate and dried to form a wettable layer the organic carrier liquid should be sufficiently volatile to facilitate such drying. A binder polymer soluble in the carrier may be included to increase bonding of the coating to the substrate.

The concentrate generally includes an emulsifier in order to facilitate blending of it with water. The emulsifier is preferably a surfactant having a high HLB value, for instance above 7. Typical surfactants are ethoxylated nonyl phenols, dioctyl esters of sodium sulpho-succinate and octyl phenol polyethoxy ethanol.

The concentration of polymer in the liquid concentrate is generally from 30 to 70%, typically about 50% by weight based on the total weight of concentrate. The amount of high HLB emulsifier is generally from 0.05 to 20% based on polymer.

Instead of including the surfactant having high HLB in the liquid concentrate, the surfactant may be incorporated with the concentrate and water at the time of blending the concentrate with the water.

Conventional additives, such as fungicides or bactericides, may also be included in the concentrate.

These liquid compositions are suspensions, that is to say they are either true suspensions or the suspended phase in them is very easily resuspended, e.g. by shaking. The compositions have low viscosity. They are capable of being blended very easily and uniformly with water. A particular advantage is that whereas it is generally very difficult to increase the concentration of an aqueous adhesive by adding more adhesive, the liquid concentrates of the invention can easily be blended with dilute aqueous adhesive compositions to form a more concentrated adhesive of uniform viscosity.

The dry particle size of the polymer particles in the aqueous compositions (that is to say the particle size the particles would have if they were not swollen by water), and the dry particle size in the organic compositions is preferably from 0.2 to 6 microns, most usually about 1 to 4 microns.

The polymeric material is wholly synthetic and thus naturally occurring polymers or modified naturally occurring polymers, such as cross-linked starch, cannot be used. Generally the synthetic polymers are made by polymerisation of one or more polymerisable monomers, generally α, β-ethylenically unsaturated monomers, preferably acrylamide or acrylic acid or a water soluble salt thereof.

The swellable polymers used in the invention are generally vinyl polymers that are cross-linked sufficient to render them insoluble but highly swellable. Thus the particles of them swell to at least 5 times their unswollen volume upon contact with sufficient water. Normally they swell to at least 20 times their initial volume. For instance their diameter may treble in size. Accordingly polymers that are substantially non-swellable such as polyvinyl acetate are unusable.

Suitable monoethylenically unsaturated non-ionic monomers include acrylamide and methacrylamide. Suitable anionic monomers include acrylic acid, methacrylic acid and water soluble salts thereof, for instance the sodium or other alkali metal salts. Suitable cationic monomers include aminoalkylated derivatives of acrylamide, methacrylamide, acrylic acid or methacrylic acid. The derivatives are preferably dialkylamino alkylated derivatives and most preferably are quaternised derivatives. Any alkylene and alkyl groups preferably contain 1 to 4 carbon atoms although adjacent alkyl groups may together form a ring or alkyl groups may be substituted by oxygen thereby converting them into hydroxyalkyl or alkoxy groups. Preferably alkyl groups are methyl or ethyl and alkylene groups are methylene or ethylene groups. Any conventional quaternising groups may be used, such as halide or alkyl sulphate. When the polymer is a polymer of an aminoalkylated group the polymer may have been formed by aminoalkylating a preformed polymer, for instance polyacrylamide, but preferably is made by polymerising an aminoalkylated monomer. Similarly quaternisation is usually conducted before polymerisation.

Suitable cross-linking agents are well known and include N,N'-methylene bisacrylamide, ethylene glycol diacrylate or methacrylate, allyl acrylate and diallyl maleate. These are added in sufficient amount to the monomer mixture to produce water-swellable polymer particles. Usually the concentration of cross-linking agent will be within the range 50 to 1000 ppm based on the weight of the other monomers, although amounts of cross-linking agent down to 30 ppm or 20 ppm are sometimes satisfactory.

If the swellable polymer is being used without soluble polymer the swellable polymer may have been made from an appropriate mixture of comonomers such that the viscosity of a 3% aqueous dispersion of the polymer is satisfactory, it often being necessary to select the monomers and conditions so as to avoid the viscosity being too high. Routine experimentation of monomer mixtures necessary to give a 3% viscosity in the preferred range can easily be conducted. Preferably the swellable polymer is made from anionic or cationic monomer and additional monomer may be introduced to reduce its viscosity. This additional monomer is preferably non-ionic. If the polymeric material has a viscosity such that the adhesive viscosity is too high for convenience then viscosity may be reduced by inclusion of an electrolyte, that may be non-polymeric and may be inorganic. This electrolyte may be added to the adhesive or may be included during the formation of the polymeric material.

Preferred swellable polymers are copolymers of acrylamide or methacrylamide or other non-ionic monomer with anionic monomers such as acrylic or methacrylic compounds such as sodium acrylate or with cationic monomers such as aminoalkylated acrylamides, methacrylamides, acrylates or methacrylates or quaternised derivatives thereof. The molar ratio between anionic or cationic groups and non-ionic or other viscosity reducing groups may vary between 10:90 and 90:10 and can be chosen by routine experimentation having regard to the viscosity and other properties desired and the cost of the monomers. Generally adhesion increases with increase in ionic monomer, especially cationic monomer and so preferably more than 50% of the monomer mixture is ionic, especially cationic, 50 to 30 parts acrylamide to 50 to 70 parts anionic or cationic groups, especially cationic, is generally satisfactory.

Another preferred class of copolymers, that can be used without any soluble polymer, are copolymers of acrylamide, or other non-ionic monomer, with sodium acrylate or other anionic monomer, in a weight ratio 90:10 to 10:90, preferably 90:10 to 50:50, most preferably 90:10 to 60:40, preferably cross-linked with 20 to 150 (most preferably 30 to 50) ppm methylene bis acrylamide or other cross-linking agent. For instance an uncrosslinked copolymer may be made and may then be crosslinked, e.g. by reaction with formaldehyde.

The cross-linking is preferably covalent. The cross-linked particles are present as separate discrete particles in the aqueous adhesive and so remain in this state during use and do not coalesce into a continuous film. This is totally different from German Offenlegungschrift No. 2414552 in which polymer particles that coalesce into a film are used.

Irrespective of whether the swellable polymer is a homopolymer or copolymer it is possible to reduce the viscosity of the composition by including electrolyte or by replacing some of the swellable polymer by water soluble polymeric material. In the aqueous compositions this polymeric material will be present in solution and it has been found that the addition of dissolved polymer in this manner reduces the viscosity of the composition. In non-aqueous compositions of the invention the water soluble polymer will initially be in solid particulate form, the particles preferably being from 0.5 to 6 microns, preferably below 4 microns, in size. The particulate water soluble polymer may be present as separate particles or may be present as a component in the particles of water swellable polymer. The soluble or dissolved polymer may be made from any of the monoethylenically unsaturated monomers mentioned above. However for optimum results it is necessary for any charge on the soluble or dissolved polymer to be compatible with any charge in the swellable or swollen polymer, and in particular if the swellable polymer is ionic the soluble polymer should have the same charge or be non-ionic while if the swellable polymer is non-ionic the soluble polymer may be anionic, cationic or non-ionic.

The soluble and insoluble polymers may be formed from different monomers or monomer mixtures but preferably they are formed of the same recurring unit or mixture of units with the swellable polymer additionally containing cross-linking units, and preferably they are formed from the same monomer or monomer mixture by a single polymerisation process that is conducted under conditions such as to give the desired proportions of swellable and soluble polymers.

The amount of soluble polymer necessary to achieve the desired viscosity can be found by experimentation but will always be very much less, e.g. less than one third, the amount of swellable but insoluble polymer. The optimum amount depends upon the particular polymers being used but in general practice the amount of soluble polymer is 1 to 19% by weight of the total polymeric material with the balance of 99 to 81% by weight being swellable polymer. Preferably the amount of soluble polymer is at least 3%, especially 3 to 10% with 97 to 90% by weight swellable polymer.

The most convenient way of forming polymer particles of the desired size is by conducting the polymerisation of the chosen monomer or monomers by the inverse emulsion polymerisation technique. This general method is described, for the preparation of water soluble polymers, in British Patent Specification No. 841,127 and the insoluble polymer, and any particulate soluble polymer can be produced by carrying out basically the same method but in the presence of the desired small amount of cross-linking agent, often 100 to 150 ppm. Inverse suspension polymerisation processes may also be used but have to be modified, by the provision of agitation conditions, such that the particle size of the polymer obtained is of the same order as in the emulsion process.

Typically, the desired monomer or monomers are dissolved in water and are then subjected to polymerisation in an organic liquid under conditions such as give the desired particle size. Conveniently the inverse suspension or emulsion polymerisation process is conducted in an organic phase comprising a volatile solvent, such as perchloroethylene, with a small amount of the hydrocarbon or other non-volatile solvent required for making the non-aqueous concentrate, and the volatile organic solvent is then removed together with the water by distillation.

The invention also includes a method of making a suspension of polymeric particles in an organic liquid, the method comprising dissolving at least one water soluble ethylenically unsaturated monomer and a cross-linking agent in water, and subjecting the solution to inverse emulsion polymerisation in an organic liquid to form polymer particles having a size below 10 microns, the proportion of cross-linking agent being such that the particles contain both swellable but insoluble material and water soluble material, and optionally, removing most at least of the water.

All compositions and methods of the invention give good adhesion on a range of wall surfaces but compositions in which the swellable polymer is a copolymer, especially a copolymer of cationic and viscosity reducing monomers such as acrylamide, have surprisingly good adhesion on a range of surfaces including plaster. Adhesion on gloss paint can be improved if necessary, especially for other compositions of the invention, by including oil swellable inorganic particles, for example oil swellable clays especially amine modified clays, for instance amine modified bentonites. A suitable material is that sold under the trade name "Bentone" by Steetley Chemicals Limited.

The optimum amount of clay will be chosen having regard to the nature and amount of oil and having regard to the characteristics of the surface to which the adhesive will be applied. Generally the amount is from 0.2 to 50, most preferably 5 to 20, parts by weight clay or other oil swellable material per 100 parts by weight of organic carrier liquid in the initial concentrate. Particularly good results are generally obtained with 10 to 15 parts, e.g. 12.5 parts by weight clay per 100 parts by weight organic carrier liquid.

The presence in the concentrate of the swollen particulate material results in an increase in viscosity of the concentrate and it may be desirable to dilute the concentrate, so as to reduce the viscosity, for instance to the same as or near the viscosity of the concentrate without the oil swollen material, by adding a solvent such as an aliphatic hydrocarbon, for example white spirit.

Aqueous adhesives of the invention are very satisfactory for a variety of adhesive uses, such as paper on paper, paper on wood or, especially, as wall covering adhesives. Thus they have satisfactory slip time, that is to say the time during which the paper can be slipped on the wall during matching of the pattern, satisfactory open time, that is to say the time taken for the coating to dry or penetrate the wall covering to a point where repasting is necessary, satisfactory lubricating properties between the surfaces being bonded during the slip time, and they can be applied without stringing, and they are sufficiently water remoistenable to permit the wall covering to be removed subsequently.

The following are some examples to illustrate the invention.

EXAMPLES 1–10

Various monomers were polymerised by an inverse emulsion technique in the presence of various amounts of cross-linker and chain transfer agent as given in Table 1. The Brookfield viscosities at 20 rpm and flow characteristics of the polymer solutions or dispersions with 3% dry solids in tap water were determined and are also given in Table 1. In each instance a non-aqueous phase and monomer phase were formed of the following composition:

| Non-aqueous phase | |
|---|---|
| Perchloroethylene | 3840 g |
| Pale Oil 150 | 192 g |
| Stabiliser | 270 g |
| Emulsifier of low HLB | 15.75 g |
| Emulsifier of high HLB | 2.75 g |

The above mixture was stirred with 50 ppm of $SO_2$ before purging with $N_2$. Conventional stabilisers and emulsifiers, of the type traditionally used in inverse emulsion processes may be used.

| Monomer phase | |
|---|---|
| Water | 1076 g |
| Monomer | 720 g |
| Sequestrant | 1.8 g |
| Acetic acid | 2.0 g |

The monomer phase was emulsified into the non-aqueous phase using a Silverson emulsifier. The system was then nitrogen purged before initiating with 10 ppm sulphur dioxide and tertiary butyl hydroperoxide at the rate of 1 ppm per minute until the theoretical heat rise was achieved. The perchloroethylene and water were then removed by distillation under reduced pressure.

The resultant non-aqueous, liquid, concentrate consisted of a dispersion in about 400 parts oil of 600 parts by weight polymer particles, all the particles having a particle size of about 3 microns, and additionally contained emulsifier.

TABLE 1

| Example No. | Monomer | ppm. Methylene Bisacrylamide | ppm. chain transfer agent | Brookfield Viscosity (Centipoise) 20 rpm. | Flow characteristics |
|---|---|---|---|---|---|
| 1 | Acrylamide | — | — | 6000 | Very Stringy |
| 2 | " | 200 | — | 30 | Short |
| 3 | " | — | 100 | 40 | Short |
| 4 | Na Acrylate | 50 | — | 46000 | Short. slight flow |
| 5 | " | 100 | — | 104000 | No flow |
| 6 | " | 200 | — | 144000 | No flow |
| 7 | " | 500 | — | 200000 | No flow |
| 8 | " | — | 50 | 6000 | Stringy |
| 9 | " | — | 100 | 2500 | Stringy |
| 10 | " | — | 200 | 1000 | stringy |

The polymer of Example No. 4 had the most satisfactory flow and other characteristics for a wallpaper adhesive and consisted of particles of water swellable polymer containing also the soluble polymer.

EXAMPLES 11–13

Blends of water soluble polymer and water swellable polymer prepared in the above examples were prepared in the proportions given in Table 2 and their Brookfield viscosities and flow characteristics determined (2% solids).

TABLE 2

| Example No. | Blend | Brookfield viscosity (centipoise) 20 rpm | Flow characteristics |
|---|---|---|---|
| 11 | 95 parts polymer of Ex. 6 + 5 parts polymer of Ex. 9 | 31500 | Slight flow. No stringing |
| 12 | 90 parts Ex. 6 + 10 parts Ex. 9 | 27000 | Slight flow. Little stringing |
| 13 | 80 parts Ex. 6 + 20 parts Ex. 9 | 21200 | Slight flow. stringy |

The compositions of Examples 11 and 12 are thus satisfactory but the composition of 13 is less satisfactory because, for the particular soluble and swellable polymers being used, the proportion of soluble polymer was too high.

EXAMPLE 14

The blends of Examples 4 and 12 were then evaluated as wallpaper adhesives. They were prepared with a solids level of 3%. The coat weight (wet) per square meter of wallpaper was 250 g in each case. The results are shown in Table 3.

TABLE 3

| Adhesive | Brookfield viscosity (centipoise) 20 rpm. | Intial slip* | Slip time (mins) | Open time (mins) |
|---|---|---|---|---|
| Ex. 4 | 46000 | 1 | 45–50 | 50–60 |
| Ex. 12 | 44000 | 2 | 45–50 | 50–60 |

*Initial Slip is defined as the degree of slippage of pasted wallpaper on application to an emulsion painted surface. Classified as 1–3, 1 being best.

The initial slip, slip time and open time for a corresponding test using 250 g/m² of a 3% cellulose adhesive were 1,20 and 30. It can be seen that the blends of the present invention have good initial slip and superior slip and open times. Their adhesive power was comparable to that of the conventional adhesives. Furthermore it was found that aqueous pastes made up from the blends could be increased in concentration quite easily by merely adding more of the concentrated blend and stirring.

EXAMPLE 15

An adhesive concentrate was prepared by mixing 1000 parts by weight of the concentrate blend obtained in Example 12, 50 parts by weight of Bentone 38 or any other oil swellable clay and 150 parts by weight of white spirit.

This concentrate was mixed with sufficient water to give a 2.5% solids paste and the resultant aqueous paste was used to paste a medium weight wallpaper on to a new alkyd gloss paint surface.

The dry adhesion was assessed after 24 hours drying at 20° C. The adhesion was found to be satisfactory with the described formulation but to be even better when double the amount of Bentone 38 was used. When the amount of Bentone 38 was reduced to 20 parts the adhesion was less satisfactory.

EXAMPLE 16

Copolymers were made and tested as described above for Examples 1 to 12. The monomers, amounts and results are given in Tables 4 and 5 in which ACM is acrylamide, Quat is a cationic monomer (quaternised diethylamino ethyl acrylate) and MBA is methylene bisacrylamide. The aqueous pastes were prepared at 3% dry polymer solids.

TABLE 4

| Example No. | Monomer ACM:QUAT | ppm MBA | Brookfield viscosity 20 rpm (centipoise) | Flow Characteristics |
|---|---|---|---|---|
| 16 | 70:30 | 100 | 22400 | short flow No stringing |
| 17 | 50:50 | 100 | 30000 | short flow No stringing |
| 18 | 35:65 | 100 | 31000 | short flow No stringing |

TABLE 5

| Example No. | Adhesion gloss painted board | $CaSO_4.2H_2O$ plastered board |
|---|---|---|
| 16 | excellent | excellent |
| 17 | very good | excellent |
| 18 | good | excellent |

The adhesion was in every case very good and better than Example 4.

EXAMPLE 19

A copolymer was made as described in Example 1 except that the monomer phase was 80 parts by weight acrylamide and 20 parts by weight sodium acrylate and, after polymerisation, the polymer was crosslinked with sufficient formaldehyde to give a 2.5% Brookfield viscosity at 20 rpm of 25,000 centipoise. The product had good flow characteristics and wet and dry adhesion properties when formulated as a 2.5% composition in water and used as a wallpaper adhesive.

EXAMPLE 20

A copolymer was made as described in Example 1 except that the monomer phase was 70 parts by weight acrylamide, 30 parts by weight sodium acrylate and 35 ppm methylene bis acrylamide and polymerisation was conducted in the presence of 5% salt, based on the weight of polymer. The product had good flow characteristics and wet and dry adhesion characteristics when formulated as a 3% composition in water and used as a wallpaper adhesive.

What is claimed is:

1. In a method in which an aqueous adhesive composition and a wallcovering are applied to a surface and the wallcovering is thereby bonded to the surface, the improvement in which the aqueous adhesive composition consists essentially of, as its adhesive component, synthetic polymeric material present in an amount of from 1 to 10% consisting substantially only of water swollen, water insoluble particles of cross-linked synthetic polymer having a dry particle size of less than 10 microns and which remain as separate discrete particles, during use of said aqueous adhesive composition the polymeric material being such that a 3% dispersion of it in deionised water has a Brookfield viscosity at 20 rpm of at least about 10,000 cps.

2. In a method in which an aqueous adhesive composition and a wallcovering are applied to a surface and the wallcovering is thereby bonded to the surface, the improvement in which the aqueous adhesive composition consists essentially of, as its adhesive component, synthetic polymeric material present in an amount of from 1 to 10% consisting substantially only of water swollen, water insoluble particles of cross-linked synthetic polymer having a dry particle size of less than 10 microns and which remain as separate discrete particles, during use of said aqueous adhesive composition the polymeric material being such that a 3% dispersion of it in deionised water has a Brookfield viscosity at 20 rpm of from about 10,000 cps to about 80,000 cps.

3. A method according to claim 1 or claim 2 in which the swollen polymer is a copolymer of a cationic or anionic monomer with at least one other monomer.

4. A method according to claim 3 in which the swollen polymer is a copolymer of acrylamide or methacrylamide with an anionic monomer or with a cationic monomer.

5. A method according to claim 3 in which the swollen polymer is a copolymer of acrylamide or methacrylamide with sodium acrylate.

6. A method according to claim 3 in which the swollen polymer is a copolymer of acrylamide or methacrylamide with a cationic monomer that comprises aminoalkylated derivatives of acrylamide, methacrylamide, acrylate or methacrylate or a quaternised derivative thereof.

7. A method according to claim 1 or claim 2 in which the polymeric material consists substantially only of a cross-linked copolymer of 50 to 90 parts by weight acrylamide and 10 to 50 parts by weight sodium acrylate.

8. A method according to claim 1 in which a 3% dispersion of the polymeric material in deionised water has a Brookfield viscosity at 20 rpm of 20,000 to 50,000 cps.

9. A method according to claim 1 in which the aqueous composition has a Brookfield viscosity at 20 rpm of 20,000 to 50,000 cps and has a concentration of polymeric material of 2.2 to 10% by weight.

10. A method according to claim 1 or claim 2 in which the polymeric material includes also 1 to 19% by weight of a dissolved synthetic polymer that is ionic and in which the dissolved polymer has the same charge as the swollen polymer or is non-ionic or the swollen polymer is non-ionic and the dissolved polymer is anionic, cationic or non-ionic.

11. A method according to claim 10 in which the swollen and dissolved polymers are formed of the same recurring unit or mixture of units.

* * * * *